April 17, 1956          C. C. RIVAS          2,742,283
FILM GUIDING AND POSITIONING MEANS
Original Filed Dec. 18, 1950
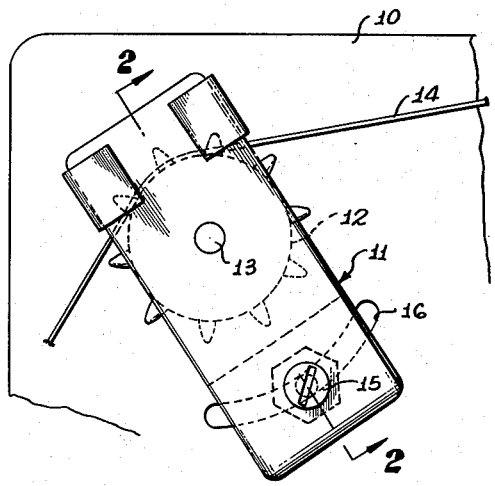
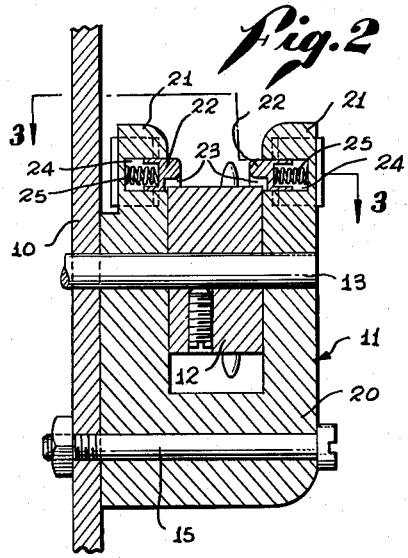
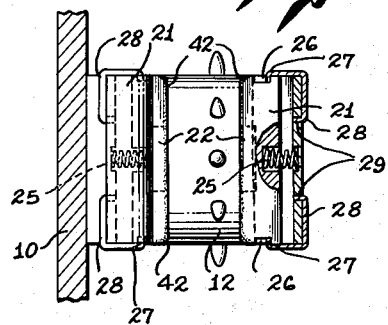
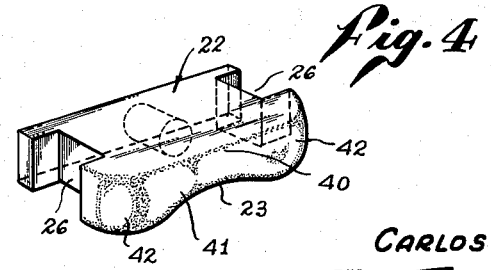
INVENTOR.
CARLOS C. RIVAS
BY
Attorney

United States Patent Office 2,742,283
Patented Apr. 17, 1956

2,742,283

FILM GUIDING AND POSITIONING MEANS

Carlos C. Rivas, Hollywood, Calif., assignor to Mark U. Serrurier, Los Angeles, Calif.

Original application December 18, 1950, Serial No. 201,439, now Patent No. 2,647,168, dated July 28, 1953. Divided and this application December 2, 1952, Serial No. 323,620

4 Claims. (Cl. 271—2.3)

This invention relates to apparatus for guiding a tape or film and more particularly to a device permitting a film to be readily placed in engagement with a rotatable element and held in such position so that it may be longitudinally driven in either direction without becoming separated from the rotatable element through unintentional transverse or vertical movement of the film.

This application is a division of my co-pending application Serial No. 201,439, filed December 18, 1950, for "Magnetic Sound Record Editing Machine," now Patent No. 2,647,168, dated July 28, 1953.

Throughout the following specification the word "film" is to be considered as meaning any type of sound-recording tape or wire, or any type of film such as motion-picture film for example.

Various mechanisms are presently employed for holding a film in engagement with a driving or supporting means such as a rotating sprocket wheel. These systems usually incorporate lever type clamps which may be manually opened to permit film to be threaded on the sprocket wheel, and then manually snapped closed to secure the film in engagement with the wheel sprockets. The manual operation of such holddown and guiding mechanisms, while relatively simple, is nevertheless time consuming especially in the case of editing film wherein the threading thereof on suitable sprocket wheels must be performed every time a cut in the film is made. Moreover, in many of the present type devices in use, the positive engaging feature of these clamps could often result in tearing of the film if for example, the sprocket teeth in the driving wheel were not properly aligned with the sprocket holes in the film.

It is a primary object of the present invention to provide an improved film guiding and positioning mechanism which readily permits a film to be properly threaded on a sprocket wheel or removed therefrom in one simple operation.

Another object is to provide such a film engaging mechanism which will not result in the tearing or damaging of a film should the sprocket holes therein not register properly with the sprocket teeth on the wheel.

Another object is to provide a film holding mechanism in which a film can be readily inserted or removed with substantially less possibility of damaging the film.

These and further objects of the present invention are attained by providing on opposite sides of a driving or supporting rotatable element, resilient means adapted to overlie the peripheral edges of the element throughout an arcuate portion of its circumference. These resilient means are adapted to slide apart or together in a direction parallel to the axis of the rotatable element, the film itself acting as the spreading means when it is inserted or removed. This action is permitted by virtue of the arcuate shape of the resilient means rendering the portion of the film lying over the rotatable element transversely rigid whereby it is sufficiently strong to wedge apart the resilient means. Thus, threading of the film simply involves forming it manually into a small arc and simply pushing it into engagement with the rotatable element. Similarly, in removing the film it is only necessary to lift it off the rotatable element.

A better understanding of the invention will be had by referring to the following detailed description in conjunction with the accompanying drawings in which:

Figure 1 shows a side view of a preferred form of the invention;

Figure 2 is a cross-sectional view as seen along the line 2—2 of Figure 1;

Figure 3 is a top view partly in section as seen along the line 3—3 of Figure 2; and, Figure 4 is a perspective view of one of the holddown claws.

Referring to the drawings, there is shown in Figure 1 a frame or support 10 which may be part of a motion-picture projector, camera, recording apparatus, or editing machine, for example, supporting a driving unit generally designated by the numeral 11. A rotatable element in the form of a sprocket wheel 12 keyed to a shaft 13 is provided for driving a film 14. The whole unit 11 may be angularly adjusted with respect to the frame 10 by means of a tightening bolt 15 operable in an arcuate slot 16 in the frame 10.

As shown best in Figure 2, the driving unit comprises a yoke 20 having two upwardly projecting arms 21, 21 supporting hold-down claws 22 having undercut arcuate bearing surfaces 23, in suitable cavities 24. The claws 23 are resiliently positioned in the cavities by coil springs 25 fitted in suitable bores formed in the claws 22 and bearing against the end walls of the cavities 24 in the arms 21. With this arrangement, the claws 22 overlie the periphery of the sprocket wheel 12 but may be pushed back into their respective cavities by a spreading force.

Referring to Figure 3, the transverse motion of the claws 22 is limited by means of notches 26 formed in opposite sides of each claw and engaged by flanges 27 on angular clips 28. The other ends of clips 28 are secured in suitable recesses 29 in the arms 21. The clips 28 may be removed by sliding them upwardly, this action releasing the claws 22 and permitting them to be removed from the cavities 24.

One of the claws 22 is shown in perspective in Figure 4. Since these claws are identical, description of one will suffice for both. As shown in Figure 4, the claw has rounded edges 40, 41 and rounded corners 42. The arcuate bearing surface 23 is adapted to cover about 60 degrees of the sprocket wheel 12. The film 14 is, therefore, bent substantially 120 degrees when passing over the sprocket. Because of this 120 degree bend in the film, sufficient lateral stiffness is developed in the bent portion to prevent any possible transverse buckling of the film such as would be necessary in order for the film to escape from the opposed claws 22 engaging the opposite film edges.

The whole driving unit, including the yoke 20, is disposed such that its longitudinal axis will bisect the angle between the operative stretch of film 14; that is, between the respective portions thereof which extend downwardly to the left into a suitable receptacle (not shown) from which the film is being withdrawn, and upwardly to the right to the mechanism into which the film is being fed. This angle of the yoke and driving unit may conveniently be adjusted by means of the tightening bolt 15 slidably operable in the slot 16 in the frame 10. With the angle of the driving unit and the yoke 20 properly adjusted, the arcuate bearing surface 23 of the claws 22 will be tangent to the film at all points throughout the arc.

In applying the film 14 to the driving unit 11 the film is inserted between the upper ends of the arms of yoke 20. The operator then simply draws downwardly the portion of film then gripped in his fingers, causing the intervening portion of film to exert downward pressure against the rounded corners 42 of the claws 22. The arched condition of the film where it engages corners 42 will stiffen it transversely and accordingly the downward pressure will be converted into lateral pressure against corners 42 causing the claws 22 to be wedged apart until the film is permitted to pass between the claws, into engagement with the sprocket wheel 12. The entire operation is performed practically instantaneously, it being possible for the operator in one quick movement to grasp the film and force it downwardly between claws 22 in one continuous motion, the claws snapping apart and back together again so as to secure the arched portion of the film in the passes formed between the periphery of the sprocket wheel and the corresponding arcuate bearing surfaces 23 of the claws 22. In removing the film a reverse procedure is followed. The operator grasps the incoming or outgoing portion of the film and simply pulls upwardly causing the respective edges of such portions to arch upwardly at the extremities of claws 22 and to exert upward pressure against the rounded corners 42. Such upward pressure is translated into spreading pressure which forces the claws 22 apart and allows the tape to become free therefrom.

It will be seen that this hold-down arrangement saves considerable time, which, in existing machines where any tape or film is fed between sprockets is wasted to a considerable extent in threading the tape or film across the sprockets and beneath suitable holding devices. Also, the present apparatus is not likely to break or tear the film when it is being inserted into or removed from the driving unit.

It is also to be noted that because of the resilient nature of the claws 22, should any of the perforations not properly register with the sprocket teeth, the resulting upward movement of the tape or film will be accommodated by the automatic retraction of claws 22 due to the spreading action of the film. If a positive holding-down clamp means were used the sprocket teeth would simply tear new holes in the film.

While a specific type of resilient claw is illustrated, it is to be understood that any resilient means having rounded bearing surfaces may be utilized. The invention, therefore, is not to be thought of as limited to the precise embodiment disclosed.

I claim:

1. An apparatus for guiding film comprising in combination: a rotatable element for engaging a film, a support member extending upwardly on one side of said rotatable element, another support member extending upwardly on the opposite side of said rotatable element, said members defining opposing cavities, claw members resiliently mounted in said cavities and adapted to overlie opposite peripheral edges of said rotatable element, said claw members having rounded corners whereby insertion of a film between said support members into engagement with said rotatable element will momentarily retract said claw members into said cavities.

2. An apparatus for guiding film comprising in combination: a rotatable element for engaging a film, a pair of spaced arms embracing said rotatable element and having end portions projecting beyond the periphery of said element, and a pair of spaced claws mounted in said end portions respectively, for limited spreading movement parallel to the axis of said rotatable element, said claws having bearing surfaces spaced from the periphery of said rotatable element to define passes slightly wider than the thickness of said film and overhanging said periphery so as to confine the edges of a portion of film resting on said periphery, said bearing surfaces being contoured to said periphery so as to maintain said portion of the film stretched in the form of a segment of a cylinder, whereby to impart transverse stiffness thereto for maintaining the film engaged in said passes, said claws having extremities defining rounded corners, which when a stretch of film under tension is pressed thereagainst, may react to the wedging action to spread said claws apart so as to permit entry or removal of the film from said passes in response to pressure exerted by the film either toward or away from said rotatable element.

3. An apparatus or guiding film, comprising: rigid, generally U-shaped supporting means forming a pair of spaced, rigid support members adapted to receive a generally cylindrical, rotatable element therebetween, at least one of said members being formed with a bore having its axis normal to the length of said members for receiving a supporting shaft for said element, a pair of claw members mounted on and adjacent the free ends of said supporting members for movement in a direction parallel to said axis, said claw members being movable toward each other to extended positions wherein the inner ends of said claw members are spaced and project a distance inwardly of the inner opposed edges of said support members whereby said inner ends are adapted to overlie opposite peripheral edges of said element, said claw members being movable away from each other to retracted positions to accommodate passage of a film therebetween, said claw members having rounded corners to facilitate said passage of the film, and means resiliently biasing said claw members to their extended positions.

4. The subject matter of claim 3 including means releasably securing said claw members to their respective support members.

References Cited in the file of this patent

UNITED STATES PATENTS

| | | |
|---|---|---|
| 1,972,555 | Fear | Sept. 4, 1934 |
| 1,986,180 | Bauch | Jan. 1, 1935 |
| 2,549,271 | Weinke | Apr. 17, 1951 |